(12) United States Patent  
Wilson et al.

(10) Patent No.: US 12,196,312 B2  
(45) Date of Patent: Jan. 14, 2025

(54) HIGH PRECISION RATCHETING MECHANISM

(71) Applicants: Brian Lee Wilson, Mountain Home, AR (US); Leslie Wilkins, Saginaw, TX (US)

(72) Inventors: Brian Lee Wilson, Mountain Home, AR (US); Leslie Wilkins, Saginaw, TX (US)

( * ) Notice: Subject to any disclaimer, the term of this patent is extended or adjusted under 35 U.S.C. 154(b) by 0 days.

(21) Appl. No.: 18/674,501

(22) Filed: May 24, 2024

(65) Prior Publication Data

US 2024/0392862 A1    Nov. 28, 2024

Related U.S. Application Data

(60) Provisional application No. 63/504,127, filed on May 24, 2023.

(51) Int. Cl.
   *F16H 7/08* (2006.01)
   *B60R 22/30* (2006.01)

(52) U.S. Cl.
   CPC ........... *F16H 7/0848* (2013.01); *B60R 22/30* (2013.01); *F16H 2007/0853* (2013.01)

(58) Field of Classification Search
   CPC ......... Y10T 74/2141; F16H 2007/0853; F16H 7/0848; E05B 15/0046
   See application file for complete search history.

(56) References Cited

U.S. PATENT DOCUMENTS

| | | | | |
|---|---|---|---|---|
| 482,794 A * | 9/1892 | Hubbell | ............. | E05B 15/0046 |
| | | | | 292/46 |
| 3,714,843 A * | 2/1973 | Bracey | ................... | B23Q 16/04 |
| | | | | 74/527 |
| 4,120,184 A | 10/1978 | Gerlach | | |
| 4,189,957 A * | 2/1980 | Gedig | .................. | B60N 2/0843 |
| | | | | 248/424 |
| 4,265,130 A * | 5/1981 | Vural | ..................... | B06B 1/162 |
| | | | | 366/128 |
| 5,176,231 A * | 1/1993 | Moody | ................... | F16H 61/22 |
| | | | | 192/220.2 |
| 5,596,910 A * | 1/1997 | Bauer | .................. | B60N 2/0825 |
| | | | | 74/540 |
| 5,782,138 A * | 7/1998 | Groche | ................ | B60N 2/0887 |
| | | | | 248/429 |
| 8,337,345 B2 | 12/2012 | Barve | | |
| 2003/0125143 A1* | 7/2003 | Seungpyo | ............. | F16H 7/0848 |
| | | | | 474/110 |
| 2005/0252335 A1* | 11/2005 | Moody | ............... | E05B 15/0046 |
| | | | | 74/578 |
| 2010/0060460 A1 | 3/2010 | Zinner | | |
| 2010/0102572 A1* | 4/2010 | Burmesch | ........... | E05B 47/0012 |
| | | | | 292/201 |

(Continued)

FOREIGN PATENT DOCUMENTS

CN    111101777 A    5/2020

*Primary Examiner* — James A English (57) ABSTRACT

A ratcheting mechanism composed of a housing that encloses a plurality of pins acting as pawls, engaging with a rack having teeth, wherein each of the pins acts independently, allowing for fine adjustments of the rack. An actuator enables seamless engagement and disengagement of the pins in relation to the rack. A sensor may be used to determine the location of at least one pin within the housing as it is related to the rack.

7 Claims, 13 Drawing Sheets

(56) References Cited

U.S. PATENT DOCUMENTS

| | | | |
|---|---|---|---|
| 2014/0091581 A1* | 4/2014 | Taurasi | E05B 15/04 |
| | | | 292/215 |
| 2016/0145894 A1* | 5/2016 | Jeong | E05C 3/24 |
| | | | 292/195 |
| 2022/0175425 A1 | 6/2022 | Wall | |

* cited by examiner

HIGH PRECISION RATCHETING MECHANISM

FIELD OF THE INVENTION

The present invention relates generally to a ratcheting mechanism. More specifically, the present invention is a ratcheting mechanism with a plurality of pinned pawls that allow for precise adjustments of the rack movement.

BACKGROUND OF THE INVENTION

A traditional ratcheting mechanism typically consists of a ratcheting wheel or a rack, a single pawl, a spring, and a housing. The rack is a linear bar or strip with evenly spaced teeth along its length. These teeth are designed to engage with a pawl or locking mechanism. The pawl is a small lever or arm that engages with the teeth of the rack. It allows the rack to move in one direction while preventing backward movement. A spring is often incorporated into the pawl mechanism to provide tension and ensure proper engagement with the teeth of the rack. The spring helps maintain contact between the pawl and the rack's teeth, preventing unintentional disengagement. The housing serves as the enclosure or framework that holds the rack, pawl, mounting bracket, and spring in place. It provides stability, protection, and structural integrity to the overall ratcheting mechanism. These components work together to create a ratcheting mechanism that enables controlled and incremental movement in one direction while preventing reverse motion. When the mechanism is engaged, the pawl locks onto the rack's teeth, allowing the rack to move in one direction. Once the system is disengaged, the pawl allows free motion in the opposite direction, thus loosening the system.

Ratcheting devices have been widely utilized in numerous industries to enable controlled and incremental adjustments. Traditional ratcheting mechanisms often rely on a coarse-toothed rack engagement system and a single pawl, allowing for limited adjustability but lacking the precision required for highly specific positioning. These conventional mechanisms may exhibit limitations in terms of accuracy, reliability, and user comfort. Existing ratcheting devices may suffer from issues such as uneven engagement, backlash, or difficulty in achieving minute adjustments. They often rely on large tooth spacing, limiting the granularity of positioning. In applications where precise and finely controlled adjustments are crucial, such as rollercoaster seat harnesses or other safety equipment, these limitations can compromise user safety, comfort, and overall performance of the system.

While the primary focus of this invention lies in enhancing rollercoaster seat harnesses, the ratcheting mechanism of the present invention is not to be limited to such and may have broader applications in various fields. Its precise positioning capabilities make it suitable for applications that require accurate and adjustable fastening systems. Potential applications may include disciplines such as aerospace, robotics, medical devices, transportation, industrial machinery, and other industries wherein such technologies may be beneficial.

One objective of the present invention is to provide a ratcheting mechanism with micro-adjusting positioning of the rack by using a plurality of pins that act as pawls. Each pin engages with the rack at a different instance while the rack moves through the housing, thus providing precise adjustments and reducing the backlash of the ratcheting system. Furthermore, the ratcheting system provides a compact housing, able to be used in rollercoaster seat harnesses and other applicable systems. The housing encloses the intricate internal components, safeguarding them from external factors and ensuring optimal functionality. An additional objective of the present invention is to provide a ratcheting mechanism with multiple adjacent pawls. The present invention utilizes a plurality of adjacent sliding pins to act as pawls. The arrangement of the pawls enables highly precise movement, ensuring accurate positioning and preventing unintended slippage during dynamic or high-stress situations. Further, an additional objective of the present invention is to provide a means for releasing the ratcheting system. The actuator enables the engagement and disengagement of the pawls with the rack.

SUMMARY OF THE INVENTION

The present invention is a ratcheting mechanism that achieves highly precise and adjustable positioning of the rack, enhancing control, comfort, and safety. The present invention comprises a robust housing that encloses a plurality of pins acting as pawls, engaging with a rack having teeth within a housing. An actuator enables seamless engagement and disengagement, ensuring reliable operation. The arrangement of these components allows for minute adjustments and a high level of positioning granularity, catering to individual preferences, body types, and safety requirements within the case of harnesses, as well as other use cases of the present invention.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a ratcheting mechanism, embodiments of the present disclosure are not limited to use only in this context.

Figure 1:
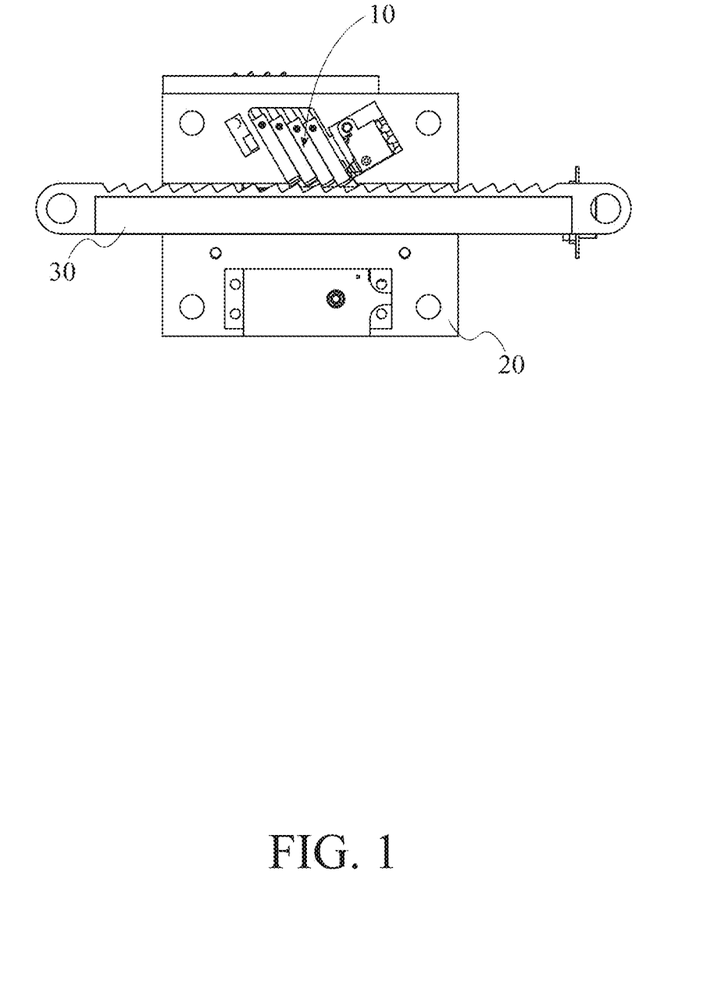
FIG. 1 is a front view of the present invention.

As shown in FIG. 1 the present invention is a high precision ratcheting mechanism comprising a plurality of pins 10, a housing 20 and a rack 30. In the context of the present invention, the plurality of pins 10 act as pawls within the housing 20, thus engaging the rack 30 at an angle. In the context of the present invention, the angle is uniform between each pin and is unchanging throughout the motion of the rack 30. In the context of the present invention, each of the pins within the plurality of pins 10 slidably engages within the rack 30 within the housing 20. In the preferred embodiment of the present invention, the plurality of pins 10 engage within the housing 20 to interfere with the rack 30, whereby preferably one pin of the plurality 10 secures the rack 30 in a stationary position.

Figure 2:
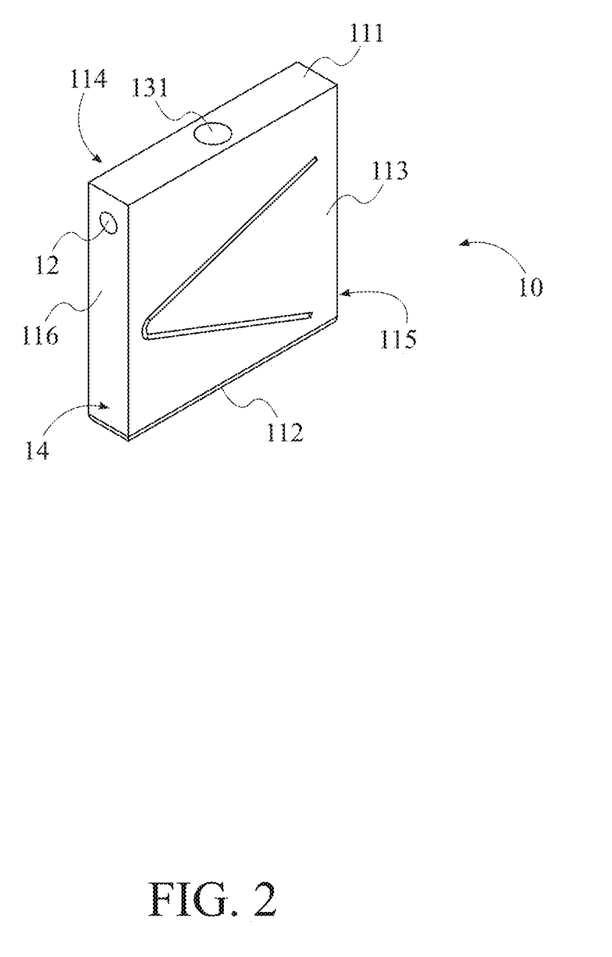
FIG. 2 is a perspective view of a pin of the present invention.

As shown in FIG. 2, the plurality of pins 10, each comprise a shape approximate that of a rectangular prism, thereby, each of the pins comprise a top end 111, a bottom end 112, a front face 113, a rear face 114, a left face 115, and a right face 116. As shown within FIG. 2, the top end 111 is located at an opposing distal end from the bottom end 112; the front face 113 is oppositely parallel to the rear face 114; and the left face 115 is oppositely parallel to the right face 116. Given that each of the pins within the plurality of pins 10 are rectangular prisms, it is understood that the left face 115 and the right face 116 are perpendicularly interposed between the front face 113 and the rear face 114, thus forming a cross-sectional area having a rectangular shape. Although described herein as comprising a rectangular cross section, in some embodiments of the present invention, the plurality of pins 10 may comprise various shapes, including those of alternate geometric prisms, such as, and not limited to, triangular prisms, cylinders, pentagonal prisms, hexagonal prisms, and those prisms having any quantity of sides. Furthermore, in the context of the present invention, each face, including the front face 113, the right face 116, the rear face 114, and the left face 115, is a rectangle, whereby the lateral sides of the rectangle are composed of the edges of two parallel faces, and the shortened sides of the rectangle are composed of the edges of the top end 111 and the bottom end 112. Referring to the previous assertion, an example of this is as follows: The rectangle forming the front face 113 of each pin is composed of an edge of the left face 115, an edge of the bottom end 112, an edge of the right face 116, and an edge of the top end 111, whereby the edge of the left face 115 is adjacent to the edge of the top end 111, the edge of the top end 111 is adjacent to the end of the right face 116, the edge of the right face 116 is adjacent to the edge of the bottom end 112, wherein the edge of the bottom end 112 is interposed between the edge of the left face 115 and the edge of the right face 116. In the context of the present invention, each pin may be understood to have a length, a width, and a height, understood by those of ordinary skill in the art as it pertains to the ordinary definitions within the context of geometric prisms.

Furthermore, as shown in FIG. 2, each pin of the present invention further comprises a recess 131. In the context of the present invention, the recess 131 is a cavity for receiving a spring member 13. In the context of the present invention, the spring member 13 is a member that provides a compressive force to each pin in the direction of the rack 30. Additionally, each pin of the present invention comprises a ferrous material 14 whereby the ferrous material 14 may activate a Hall sensor 26. Furthermore, in some embodiments of the present invention, each pin of the plurality of pins 10 may comprise a pin hole 12, also referred to herein as the mounting hole 12. In the context of the present invention the mounting hole 12 may act as a point of connection between the pin and the spring member 13, wherein a fastening means, including a screw, may be used to couple the spring member 13 and the pin.

Figure 3:
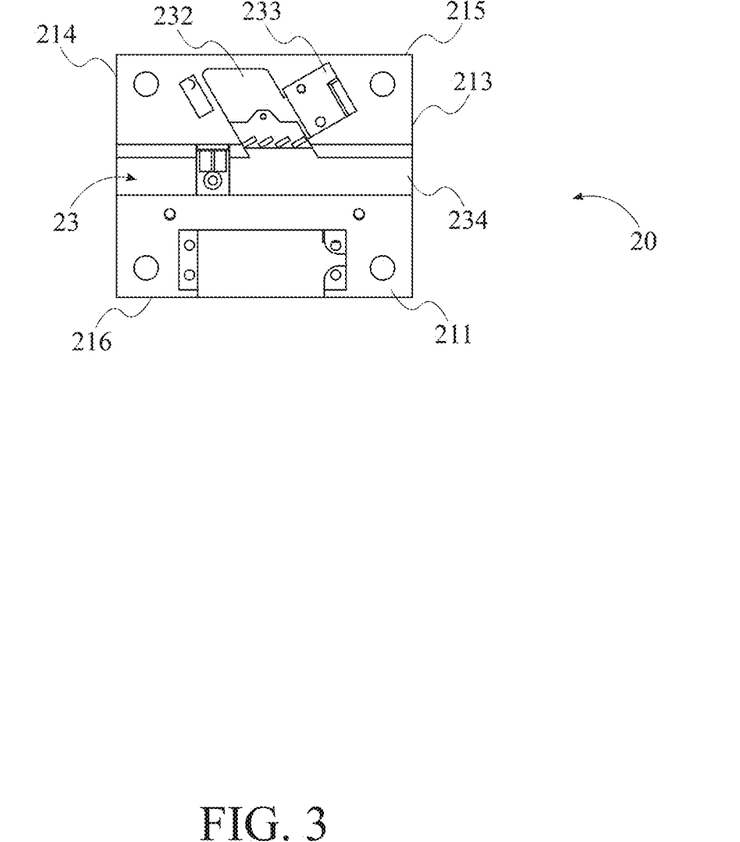
FIG. 3 is a front view of the housing of the present invention.

As shown in FIG. 3, the housing 20 is a body comprising a plurality of sides, and a cutout 23. Within the context of the present invention, the housing 20 comprises a front face 211, a rear face 212, a first lateral face 213 (referred to herein as the left face) and a second lateral face 214 (referred to herein as the right fact), a top face 215, and a bottom face 216, wherein said faces are exterior, outwardly facing surfaces of the housing 20. The housing 20, thereby, comprises a volume, wherein the cutout 23 is extruded. Although the faces of the housing 20 have been described as having direction, the definitions "front," "rear", "top," and "bottom," are for the purpose of describing the present invention herein and are not limiting to such in practice. In the context of the present invention, the shape of the housing 20 is substantially that of a prism. In the preferred embodiment of the present invention, the cutout 23 is extruded into the body via the front face 211, wherein said cutout 23 comprises two channels; a pin channel 232 and a rack channel 234.

Figure 4:
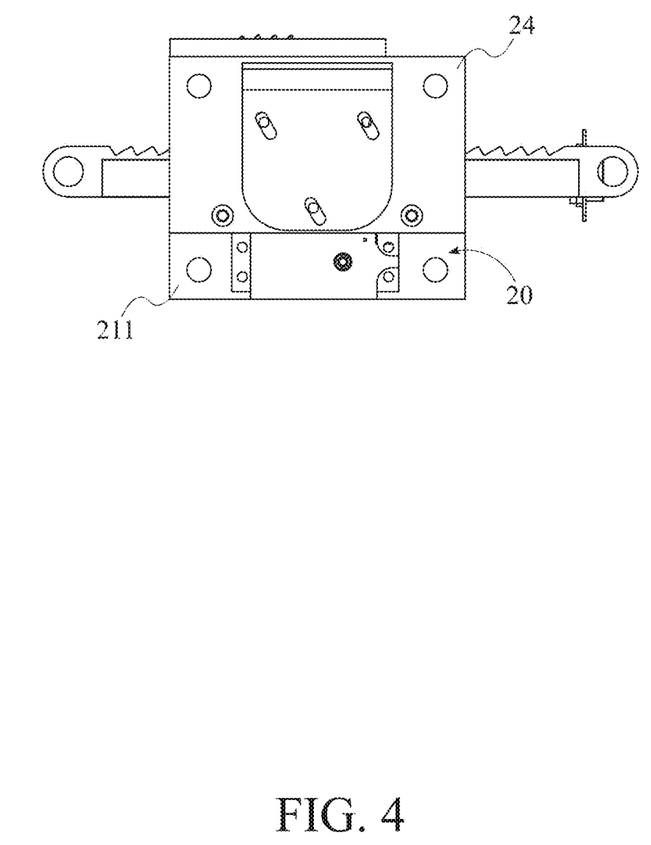
FIG. 4 is a front view of the present invention further comprising the front cover.

The rack channel 234 is a recessed channel traversing the housing 20 from the left face 213 to the right face 214, perpendicularly, forming a bottom guide rail for the rack 30. The pin channel 232 intersects the rack channel 234 at an angle. In some embodiments of the present invention, the pin channel 232 intersects the rack channel 234 at an angle between 30-60 degrees. In the preferred embodiment of the present invention the pin channel 232 intersects the rack channel 234 at an angle of 45 degrees. In some embodiments of the present invention, the casing further comprises a front plate 24, as shown in FIG. 4, wherein said front plate 24 is secured to the front face of the housing 20, thus enclosing the two channels 232,234. In some embodiments of the present invention, the housing 20 further comprises an at least one fastening means. In the context of the present invention, the fastening means may comprise a means of securing the ratcheting mechanism to a structure including a mounting hole 251.

Figure 5:
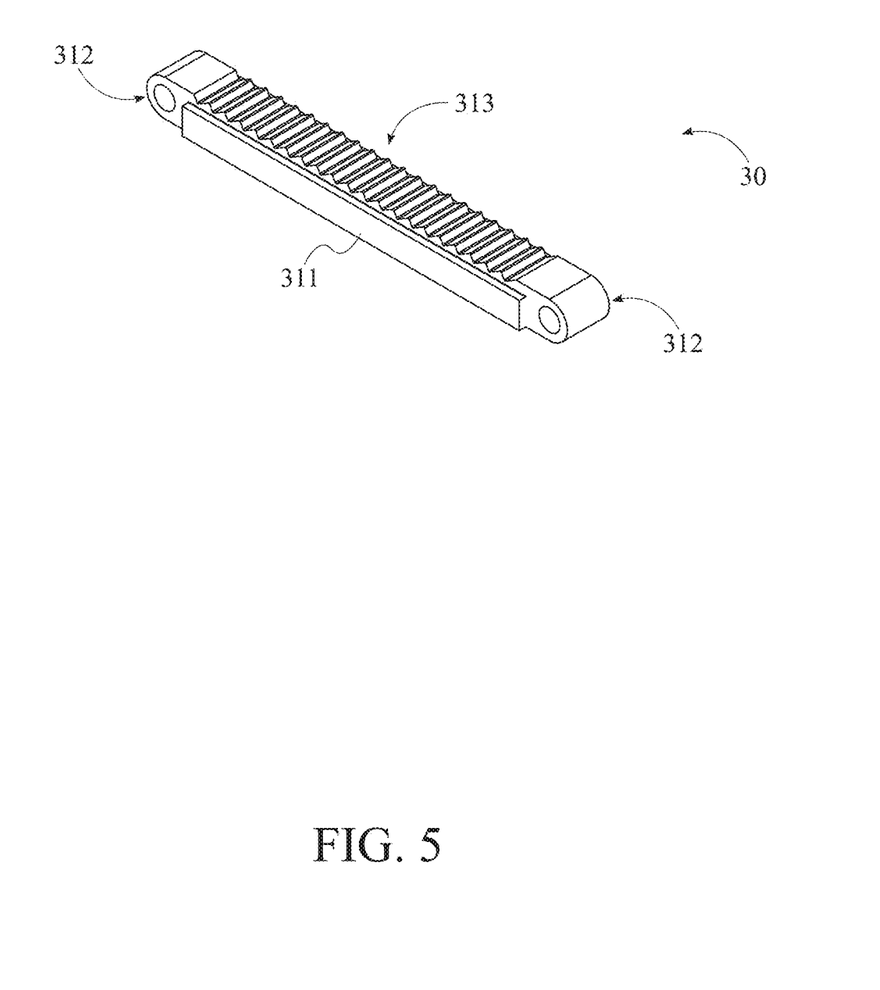
FIG. 5 is an perspective view of the rack of the present invention.
Figure 6:
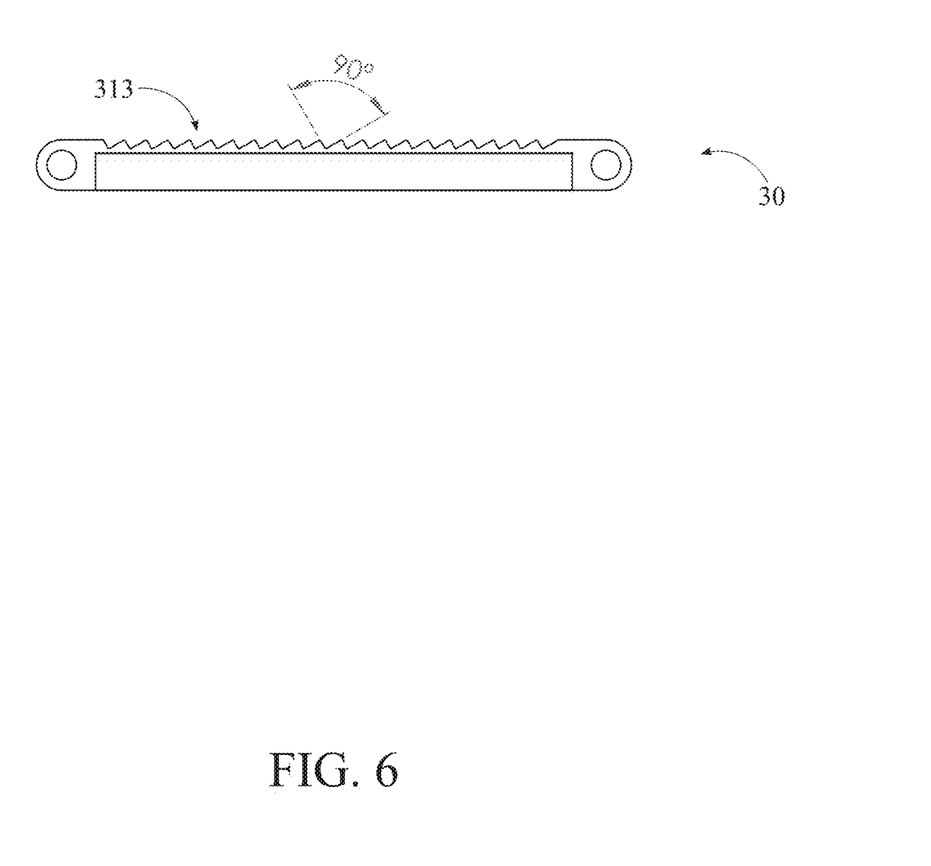
FIG. 6 is a front view of the rack of the present invention.
Figure 7:
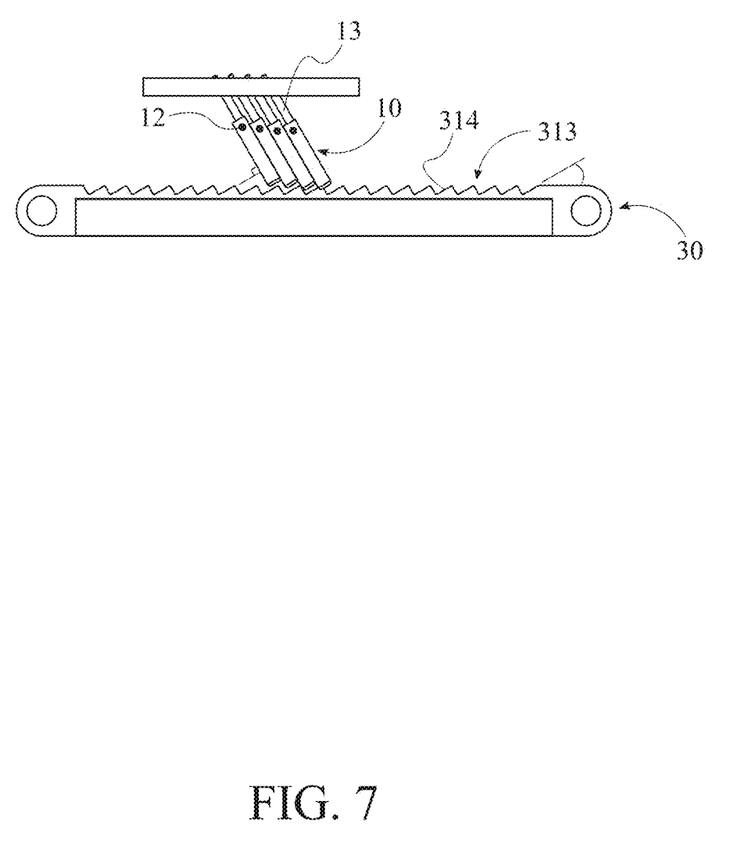
FIG. 7 is a front view of the pin and rack interface of the present invention.

As shown in FIG. 5 and FIG. 6, the rack of the present invention comprises a rod comprising two elongated parallel side faces 311, two opposing ends 312, a bottom side, and a plurality of teeth 313. The two elongated parallel side faces 311 as referred to herein, refer the two faces of the rack 30 that traverse the length of the bottom side, protruding perpendicular to such. The plurality of teeth 313 of the rack 40 are composed of a series of evenly spaced angled grooves, each comprising a uniform profile angle 314. The teeth of the rack comprise a tooth interface 314, wherein said tooth interface 314 is the face of the tooth that interferes with the pins 10. In the preferred embodiment of the present invention, the profile angle 314 of the teeth of the rack 30 are angled at an angle normal to that of the pin channel 232, thus when a pin 10 engages with the rack 30, the force being applied onto the pins 10 by the spring 13 is normal to the tooth interface 314, as shown in FIG. 7. In the context of the present invention, the angle in which the plurality of pins 10 traverse within the housing 20, remain normal to the profile angle 314 of the teeth of the rack 30, regardless of which pin is fully engaged with the rack 30.

Figure 8:
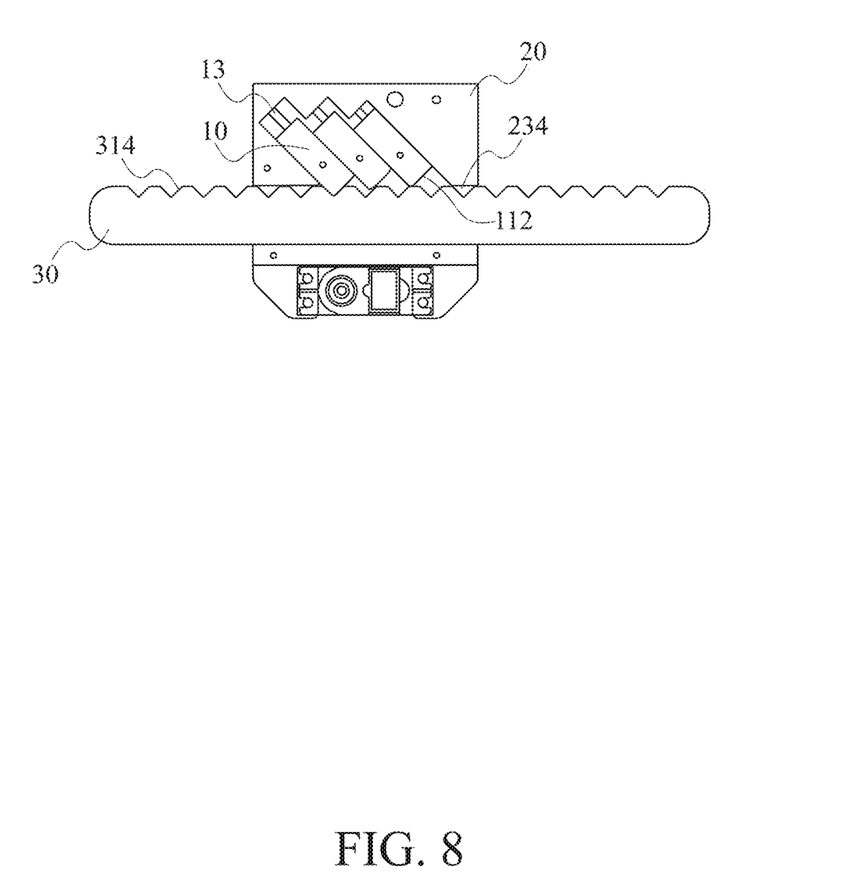
FIG. 8 is a front view of the present invention.

In the ratcheting mechanism, as shown in FIG. 8, the rack 30 slides through the rack channel 234 of the housing 20, whereby the bottom guide rail of the housing interfaces with the bottom side of the rack 30. The plurality of pins 10 of the present invention are adjacent to each other. In the present invention, the plurality of pins 10 comprises two pins that are adjacent to a single pin, wherein said pins are engaging with one other pin and the wall of the housing 20, referred herein as a first end pin and a second end pin. As the rack of the present invention slides through the rack channel, the plurality of teeth 313 of the rack 30 engage with the bottom face 112 of the plurality of pins 10. In some embodiments of the present invention, the spring forces 13 the plurality of pins 10 downwardly towards the rack channel 234 and the rack 30. In the preferred embodiment of the present invention, when in a locked position, a single pin engages with the rack 30 tooth interface 314, whereby the other pins are disengaged, as shown in FIG. 8. In the aforementioned embodiment, this provides a means of producing finer adjustments. As a force is applied to the rack 30 in a direction opposing the direction of the pin channel 232, the interaction between the housing 20, the first end pin, and the second end pin, provides a reactive force, thus preventing movement of the rack. Contrarily, when a force is applied in a direction congruent with the pin channel 232, the plurality of pins 10 will be forced into the pin channel 232, allowing for the rack 30 to move freely through the rack channel 234.

Figure 9:
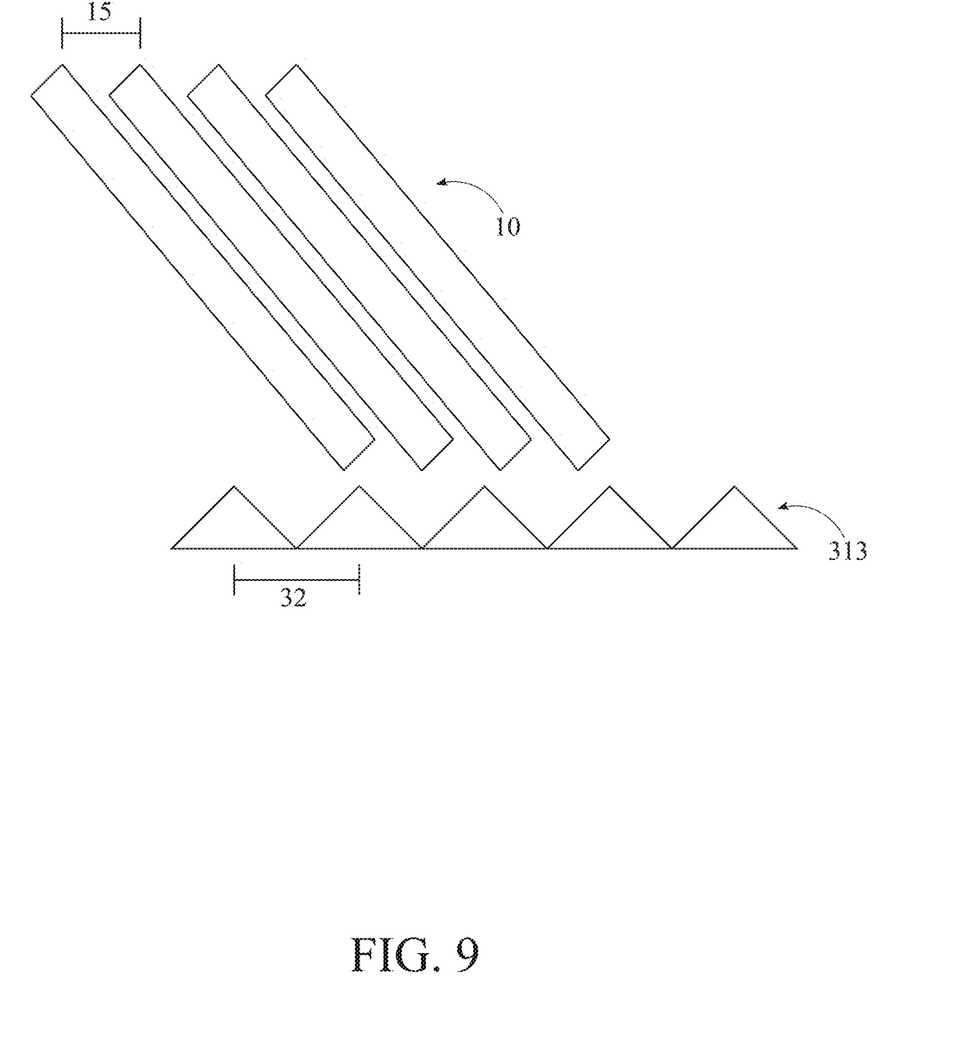
FIG. 9 is a diagram of the pin distance and the teeth distance of the present invention.

Additionally, in the context of the present invention, the plurality of pins 10 comprises a pin distance 15 wherein the pin distance 15 is the distance of separation between two symmetric locations of adjacent pins, as shown in FIG. 9. Furthermore, within the context of the present invention, the rack comprises a teeth distance 32 (pitch) whereby said teeth distance 32 is the distance between symmetric locations of adjacent teeth. In the preferred embodiment of the present invention, the pin distance 15 and the teeth distance 32 are nonuniform, relative to each other. In the context of the present invention, specifically in the context of the pin distance 15 and the teeth distance 32, nonuniform is defined as a ratio that is not equal to 1:1. For example, the pin distance 15 and the teeth distance 32 may not share a common distance as this would produce undesired consequences, resulting in coarse adjustments of the rack, rather than the fine adjustments preferred within the present invention.

Figure 10:
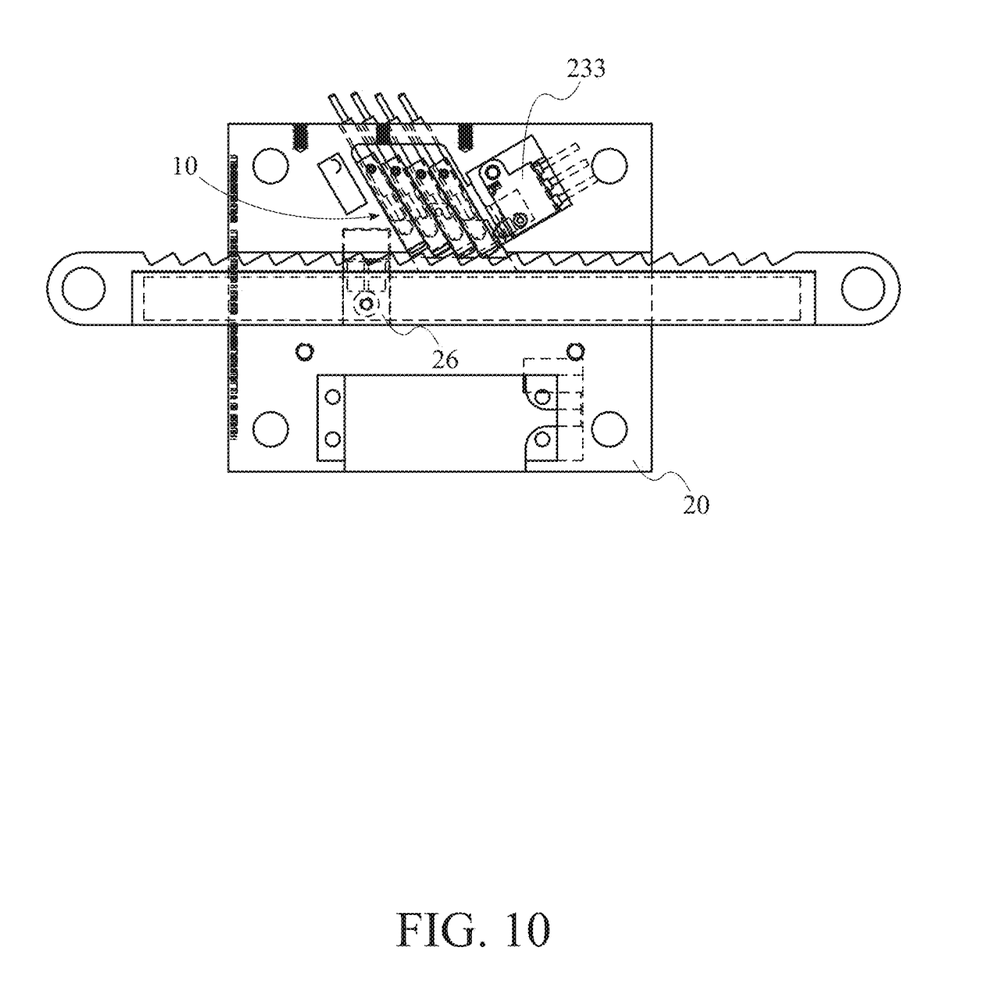
FIG. 10 is a front view of the present invention showing internal components of the present invention as broken lines.
Figure 11:
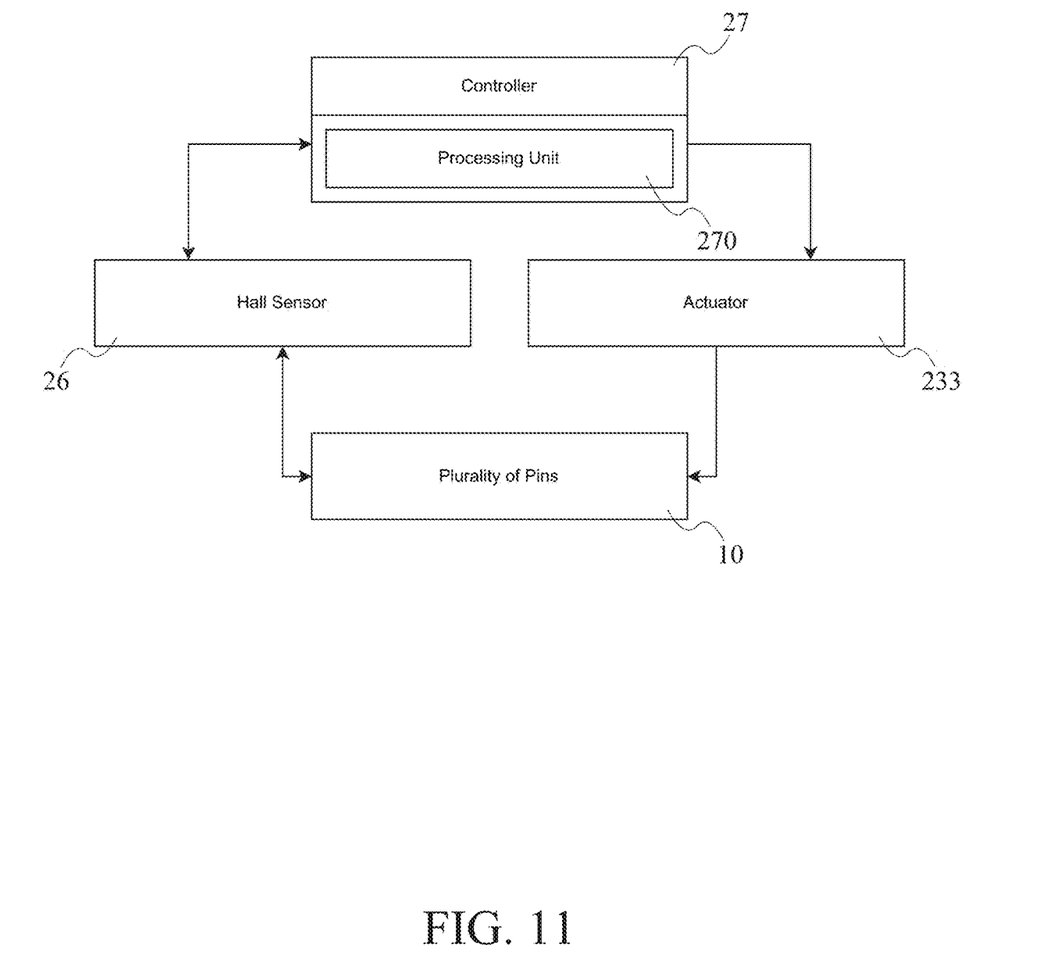
FIG. 11 is an electronic systems communication diagram of the present invention.

In the preferred embodiment of the present invention, the housing 20 further comprises an actuator 233 and a controller 27 comprising a processing unit 270, as shown in FIG. 10 and FIG. 11. In the preferred embodiment of the present invention, the actuator 233 and the controller 27 disengage the plurality of pins 10 from the tooth interface 314 of the rack 30, allowing the rack 30 to slide in a reverse direction. Furthermore, in the preferred embodiment of the present invention, the actuator 233 is a programmable industrial servo requiring 7.7 volts DC. In an additional embodiment of the present invention, the controller 27 is a microcontroller with a processor such as a Seeed Studio XIOA RP2040 Microcontroller and the like.

Figure 12:
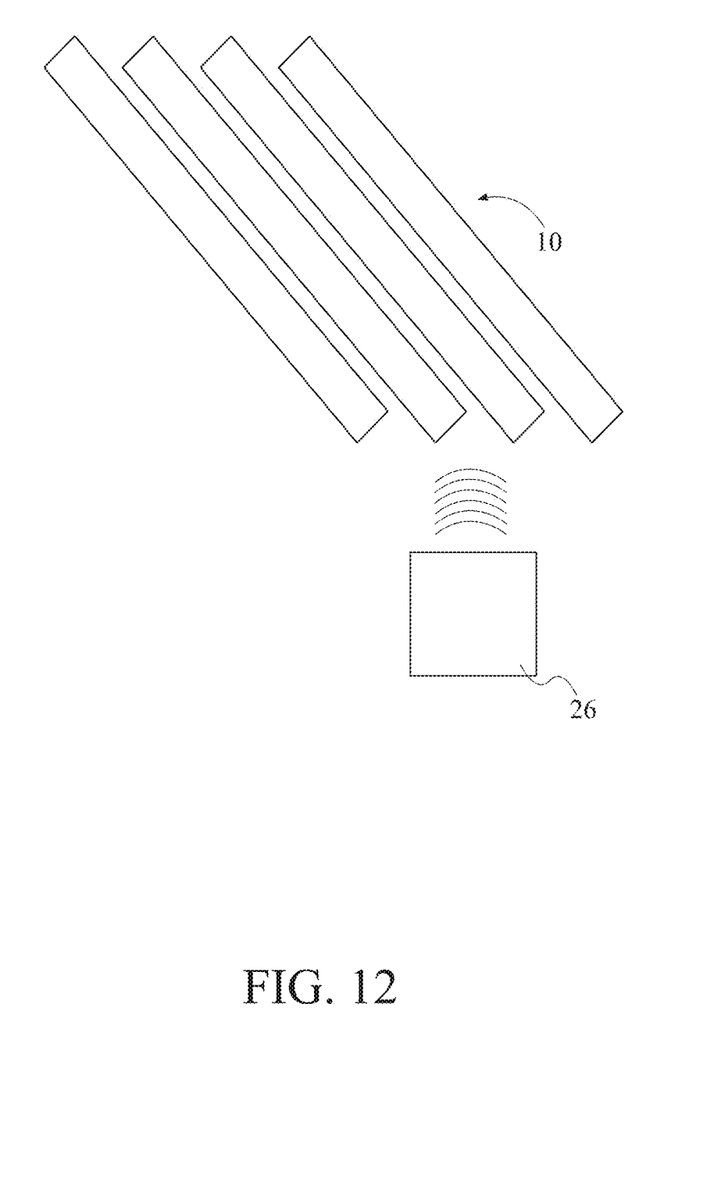
FIG. 12 is a diagram of the Hall sensor and pins of the present invention.

Additionally, within the preferred embodiment of the present invention, as shown in FIG. 11 and FIG. 12, the housing 20 further comprises the Hall effect sensor 26 (a Hall sensor). In the context of the present invention, the Hall sensor 26 is a sensor that produces a voltage proportional to magnetic field differentials. Within the preferred embodiment of the present invention, the Hall sensor 26 may be utilized to determine the location of at least one pin, further indicating to the user which pin is engaged with the rack 30. Furthermore, within the preferred embodiment of the present invention, the sensor 26 detects a magnetic field differential produced from the movement of at least one pin; the sensor then sends a signal to the processing unit 270 wherein said processing unit 270 may be used to determine the location of at least one pin. In the context of the present invention, the location of the at least one pin may be used to determine which pin is being engaged with the rack.

Figure 13:
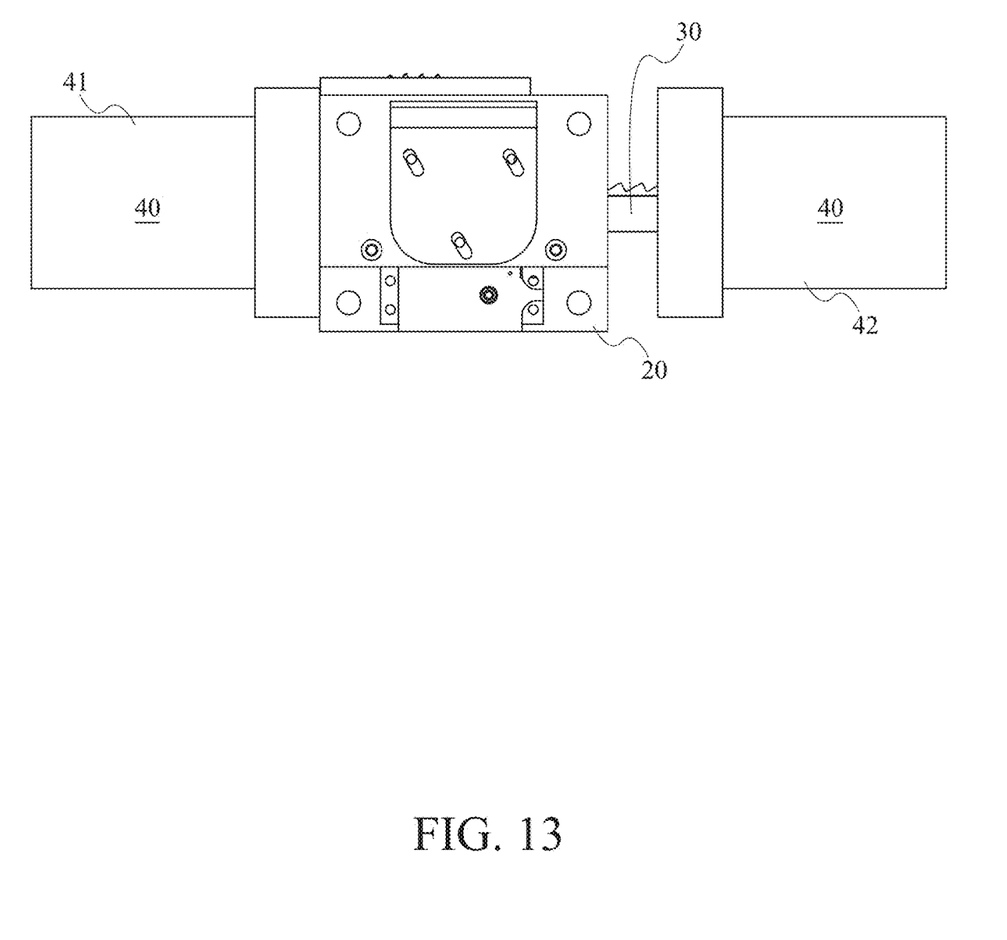
FIG. 13 is a diagram of the present invention secured to a harness device.

In the preferred embodiment of the present invention, as shown in FIG. 13, in some embodiments of the present invention, the high precision ratcheting mechanism may be coupled to a harnessing device 40, including a strap, seatbelt, harness, and components of the like, whereby a user may use fine adjustments to secure the harnessing device. In such embodiments, the harnessing device may comprise a first portion 41 and a second portion 42 wherein said portions are coupled to the housing 20 and the rack 30, respectively, allowing for the first portion 41 and the second portion 42 to be adjustably secured to each other via the high precision ratcheting mechanism.

Although the invention has been explained in relation to its preferred embodiment, it is to be understood that many other possible modifications and variations can be made without departing from the spirit and scope of the invention.

What is claimed is:

1. A high precision ratcheting mechanism comprising:
a housing;
a plurality of pins;
a rack; and
a harness;
wherein:
the housing being a body, containing the plurality of pins and the rack, whereby the plurality of pins and the rack slidably traverse within the housing;
the housing further comprising:
a cutout comprising:
a pin channel; and
a rack channel;
wherein:
the pin channel intersects the rack channel at a 45° angle, thereby enabling the plurality of pins interacts with the rack at such angle;
the plurality of pins being slidably interposed within the pin channel; and
the rack being slidably interposed within the rack channel;
the plurality of pins slidably engages with the rack at a 45° angle wherein said angle is uniform between pins;
said angle is constant throughout movement of the rack;
each pin of the plurality of pins interacts with the rack independently;
at least one pin of the plurality of pins fully engages the rack when in a locked configuration;
the harness comprising a first portion and a second portion;
the first portion being coupled to the housing;
the second portion being coupled to the rack;
wherein:
movement of the rack in relation to the housing adjusts the positioning of the first portion of the harness in relation to the second portion of the harness; and
the high precision ratcheting mechanism interposed between the first portion of the harness and the second portion of the harness is an adjustable locking mechanism.

2. The high precision ratcheting mechanism as claimed in claim 1 further comprising a sensor wherein said sensor may locate a position of at least one pin within the housing.

3. The high precision ratcheting mechanism as claimed in claim 1 wherein the rack comprises a plurality of teeth;
the plurality of teeth comprising a profile angle; and
the profile angle being perpendicular to the angle in which the plurality of pins engages with the rack.

4. The high precision ratcheting mechanism as claimed in claim 1 wherein each pin comprises a spring;
said spring providing a force on the respective pin at an angle normal to the profile angle of the rack.

5. The high precision ratcheting mechanism as claimed in claim 2 wherein each of the pins within the plurality of pins comprise a ferrous material wherein movement of the pin creates a magnetic field that is detected by the sensor; and
said sensor being a Hall effect sensor.

6. The high precision ratcheting mechanism as claimed in claim 1 wherein the housing further comprises a front plate;
said front plate enclosing the rack and plurality of pins within the housing.

7. The high precision ratcheting mechanism as claimed in claim 1 further comprising a processing unit and an actuator;
the processing unit and the actuator being contained within the housing.

* * * * *